July 26, 1949.    H. B. BABSON ET AL    2,477,035
MILKING PARLOR
Filed Feb. 25, 1946    3 Sheets-Sheet 1
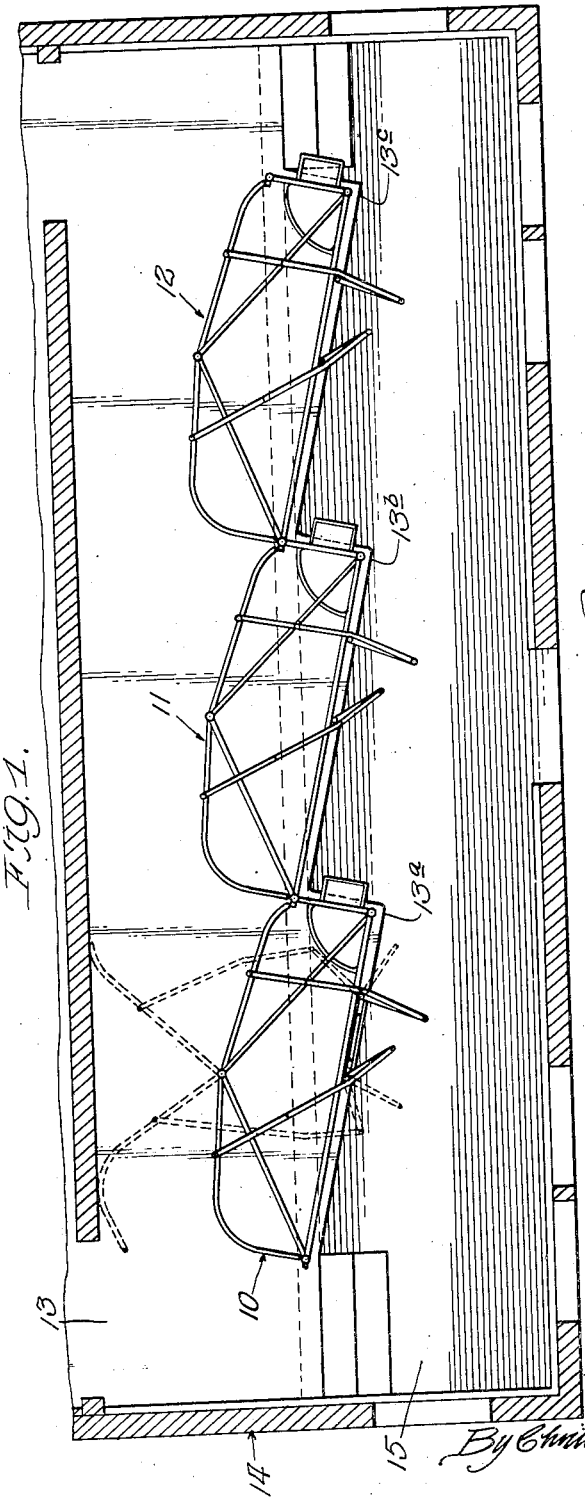
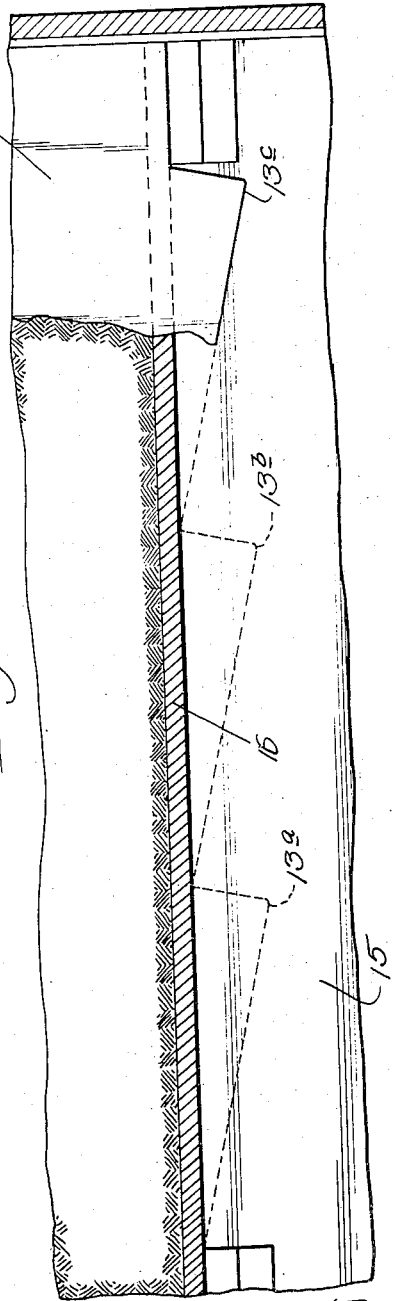
Inventors:
Henry B. Babson,
Chester A. Thomas,

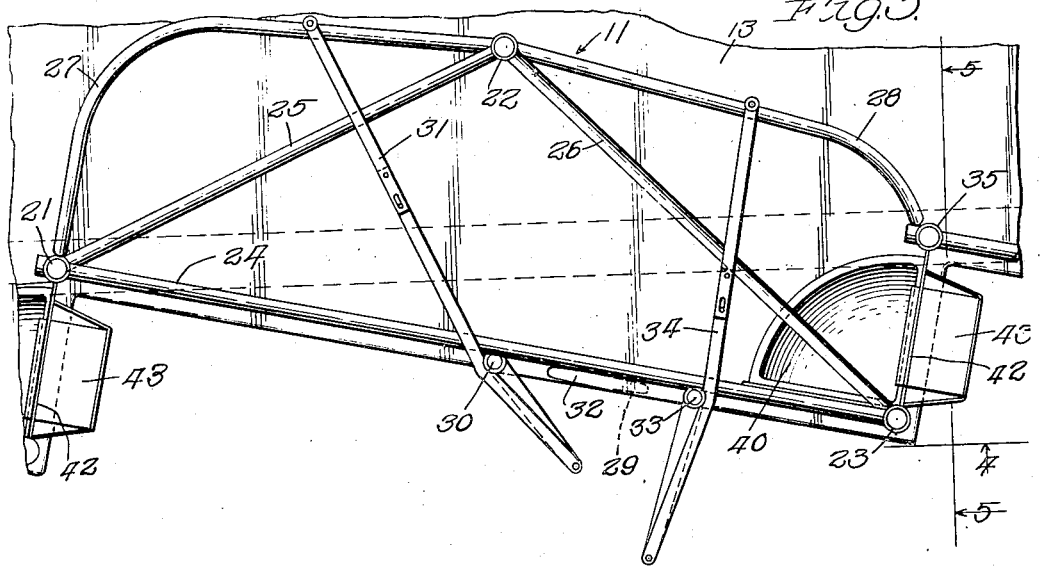

July 26, 1949.  H. B. BABSON ET AL  2,477,035
MILKING PARLOR
Filed Feb. 25, 1946  3 Sheets-Sheet 3
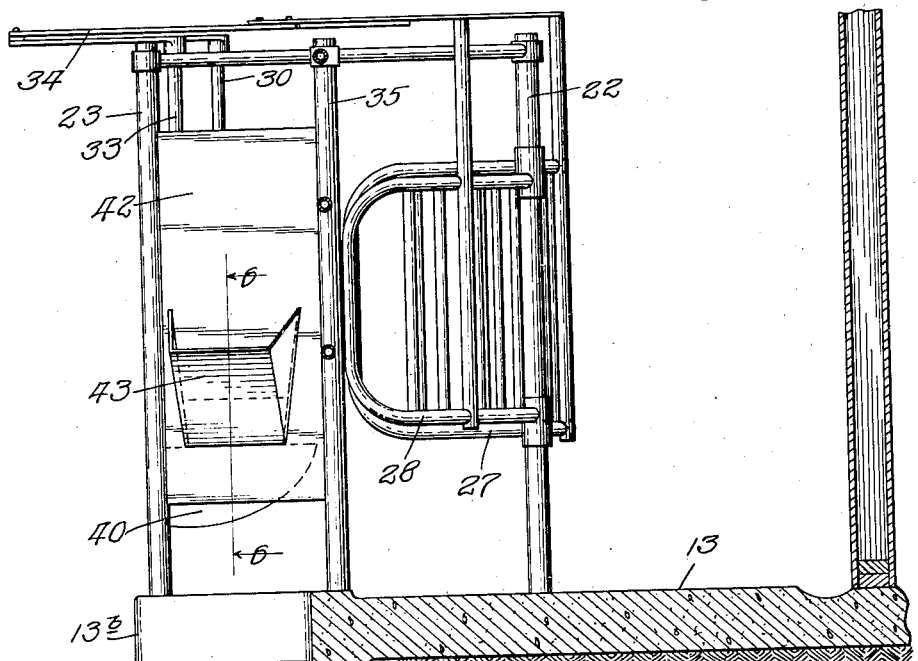
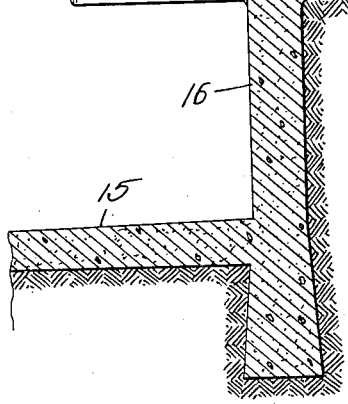
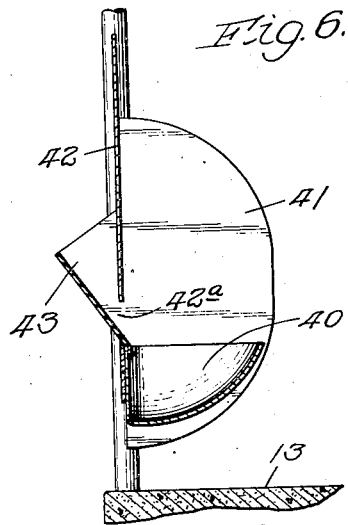
Inventors:
Henry B. Babson,
Chester A. Thomas,
By Clinton, Schroeder, Merriam & Hofgren,
Attys.

Patented July 26, 1949

2,477,035

UNITED STATES PATENT OFFICE 2,477,035

MILKING PARLOR

Henry B. Babson, Chicago, and Chester A. Thomas, Crystal Lake, Ill., assignors to Babson Bros. Co., a corporation of Illinois Application February 25, 1946, Serial No. 649,924

7 Claims. (Cl. 119—16)

This invention relates to a milking parlor, and more particularly to an improved parlor stall and milking parlor construction.

The present application is primarily concerned with improvements in a milking parlor and stall arrangement of the general type shown in Babson and Stampen Reissue Patent 22,657 of August 7, 1945.

We have found it highly desirable to arrange a plurality of parlor stalls in a milking parlor in zigzag or stepped relationship, as disclosed and claimed in the above-mentioned reissue patent; and to have the cow floor (the floor on which the cows walk and on which the stalls are placed) at a higher level than the operator's floor or alley. If there is something in the neighborhood of a couple of feet difference in the floor levels the operator can place milking machines in operation and remove them from under the cow at a level which is much more convenient and which greatly reduces the effort otherwise necessary if the operator must stoop to a low level to put the machine into and remove it from milking position. The desired stepped relationship of the stalls, however, requires an irregular margin on the upper floor, and this has heretofore always been carried down with a similarly formed stepped or zigzag wall extending to the level of the floor of the operator's alley. We have found that this makes cleaning of the operator's alley particularly difficult, and has heretofore resulted in spilled milk and other waste and dirt collecting in the corners of the zigzag wall rising from the floor of the operator's alley; yet it has heretofore been thought impossible to have a straight wall, with an easily-cleaned junction with the operator's floor, since the operator must be able to get in close to the back end of the stall where the cow's udder is during handling of the milking machines.

We have overcome this difficulty by making use of a regularly formed wall, as contrasted with a zigzag wall having right angle corners therein, rising from the floor of the operator's alley along a line back from the projecting ends of the stalls; and then by having the floor supporting the stalls with at least a portion of its irregular margin projecting out over this wall. The critical point of juncture, of course, is the juncture of the rising wall with the floor of the operator's alley; and the fact that a higher level has zigzags or sharp angles in its does not prevent ready and effective cleaning as long as the juncture line between the wall and the operator's floor is regularly formed. We are using this term "regularly formed" in the sense of a wall which does not have dihedral angles (that is, sharp and sudden changes in direction), but which may be curved as well as straight, since some milking parlors have the stalls arranged in a circle. The point is to avoid sharp corners and angles.

Yet another feature of this invention is the provision of an improved feeding trough and chute arrangement at the end of each parlor stall, facilitating feeding a grain supplement, for example, to the cows during milking. We have found it very desirable, for example, to give each cow a measured amount of grain during milking (as two pounds), and to provide the necessary variation between feed quantities for different cows in further feeding immediately after the milking has been completed and in a different location, as in a loafing barn or back in the main barn. In order to feed grain in this manner to each cow during milking, a measured amount must be provided for the stall each time a new cow is brought into the stall, generally about once every three minutes; and previous feeding trough arrangements have not enabled this to be done with the requisite convenience.

Other features and advantages of this invention will be apparent from the following specification and the drawings, in which:

Figure 1 is a plan view of one form of milking parlor embodying our inventions; Figure 2 is a horizontal fragmentary sectional view, partly broken away, and with the stalls removed, to show the relationship between the supporting wall and the floor of the operator's alley; Figure 3 is an enlarged plan view principally consisting of a single stall; Figure 4 is a side elevational view of the apparatus shown in Figure 3 taken along line 4 of Figure 3; Figure 5 is a transverse vertical sectional view along the line 5—5 of Figure 3; and Figure 6 is an enlarged fragmentary vertical sectional view of the feeding trough and chute, along the line 6—6 of Figure 5.

In the particular embodiment of the invention illustrated herewith three parlor stalls designated in general as 10, 11 and 12 are shown as aranged in zigzag or stepped relationship (in accordance with the teachings of the above-mentioned Reissue Patent 22,657, to which reference may be made to supplement the present disclosure if desired) on the cow floor 13, the higher level floor of the two floors in the milking parlor barn here indicated in general as 14. The other side of the milking parlor barn is here indicated as provided with a floor 15 at a lower level, this providing the operator's working floor or operator's alley, as it is sometimes termed, suitable sets of steps being provided for communication between the two floors which are preferably about two feet different in level, as may be best seen in Figure 5.

The cow floor is provided with an irregular margin comprising the triangular portions 13a, 13b and 13c, these triangular portions each having one long side and one short side and in general having an area of the same order as that of half the area required for each stall. Between the cow floor 13 and the operator floor 15 is a supporting wall 16, this wall being regularly formed; that is, with no sharp angles or changes of directions, the particular wall shown here being straight. As may be best understood from Figures 2 and 5, the saw tooth shaped margin of the upper floor consisting of the triangular portions 13a, 13b and 13c projects out from this wall 16, so that at the level of the cow floor the margin is irregular. Nevertheless, since the wall 16 is regularly formed the junction line between the wall 16 and the floor 15 of the operator's level is regular and without any sharp irregularities, so that it may be readily completely cleaned as by flushing with a hose or sweeping with a broom.

Referring now more particularly to Figures 3 and 4, and describing the stall 11 as representative, it will be seen that each stall comprises a triangular section as its basic or main framework. In the stall 11, for example, this triangular frame comprises the vertical members or posts 21, 22 and 23, with their lower ends set in the concrete of the cow floor 13, and with their upper ends held in the desired relationship by bracing members 24, 25 and 26, generally of pipe. The posts 21 and 23 are on the side of the stall toward the operator's alley, while the post 22 is on the opposite side of the stall, as may be best seen in Figure 3; and this latter post serves as the pivotal mounting means for entrance and exit gates here identified in general as 27 and 28. Manual operating means including the handle 29, riser member 30 and interconnecting linkage 31 serves to enable the gate 27 to be moved between opened and closed position and locked in closed position; and handle 32, riser member 33 and connecting linkage 34 serve similarly for the exit gate 28. The general construction and operation of such gates and their action may be further gone into if desired by reference to the above-mentioned Reissue Patent 22,657, or the copending Thomas application Serial 522,883, filed February 18, 1944. The exit gate 28 cooperates with the vertical post 35 of the next stall in the line of parlor stalls, corresponding to the post 21 of the stall just described.

Referring now more particularly to Figures 4, 5 and 6, it will be seen that each stall is provided in the end thereof with a feeding trough, as the trough 40, this preferably being behind a shield member 41 adapted to minimize the amount of feed which the cow may accidentally knock over into the operator's alley. In order to prevent any feed from being forced up over the end of the trough 40 and out through the end of the stall, an end plate 42 is provided for a similar shielding purpose. Heretofore proper shielding of the feed trough has rendered its frequent filling rather difficult, and we have obviated this difficulty by providing a chute 43 in the end of each stall communicating through the opening 42a with the interior of the trough 40. By locating this chute in the end of the stall it is out of the way, not interfering with operation of the handles 29 and 32 controlling the position of the gates nor projecting out into the normal walking path of an operator so that he might catch his clothes, bruise his arm, or the like. On the other hand, the chute is in a location and at a level where filling the trough with a measured amount of grain or feed is very convenient, as the stepped arrangement of the floor margin is such that the operator can step right up to the chute when he desires to do so. Moreover, its location is such that unnecessary walking is minimized, as the operator can turn to his left hand, fill the feed trough of a stall into which has has just admitted a cow, and on which a milker has been placed, then turn, without further walking, to the right to open the gates of the next stall, let out the cow that has just been milked, admit a new cow and place a machine in operation on the new cow.

While we have shown and described certain embodiments of our invention, it is to be understood that it is capable of many modifications. Changes, therefore, in the construction and arrangement may be made without departing from the spirit and scope of the invention as disclosed in the appended claims.

We claim:

1. A milking parlor comprising: an operator's floor at a certain level; a cow floor at a higher level, said cow floor having an irregular margin at least partly projecting over and spaced above the operator's floor; and a plurality of stalls on the cow floor having portions thereof directly above the operator's floor adjacent said margin.

2. A milking parlor comprising: an operator's floor at a certain level, this floor having a wall rising therefrom and characterized by an absence of dihedral angles; a cow floor at a higher level, said cow floor having an irregular margin supported by said wall and at least partly projecting over and spaced above the operator's floor; and a plurality of stalls on the cow floor having portions thereof directly above the operator's floor adjacent said margin.

3. A milking parlor comprising: an operator's floor at a certain level, this floor having a wall rising therefrom and characterized by an absence of dihedral angles; a cow floor at a higher level, said cow floor having a saw-tooth shaped margin supported by said wall and at least partly projecting over and spaced above the operator's floor; and a plurality of stalls on the cow floor having portions thereof directly above the operator's floor adjacent said margin.

4. A milking parlor comprising: an operator's floor at a certain level, this floor having a wall rising therefrom and characterized by an absence of dihedral angles; a cow floor at a higher level, said cow floor having a saw-tooth shaped margin supported by said wall and at least partly projecting over and spaced above the operator's floor; and a plurality of stalls on the cow floor having portions thereof directly above the operator's floor adjacent said margin, each saw-tooth portion having one edge with a length of the same order as that of a stall and the other edge with a length approaching the width of a stall, each such portion at least partly supporting a stall.

5. A milking parlor comprising: an operator's floor at a certain level; a cow floor at a higher level, said cow floor having a saw-tooth shaped margin; and a plurality of stalls in stepped arrangement on the cow floor adjacent said margin, each saw-tooth portion having one edge with a length of the same order as that of a stall and the other edge with a length approaching the width of a stall, each such portion at least partly supporting a stall and each stall having a feed trough and feed chute fixedly attached at one end thereof, each stall having a substantial portion thereof spaced from and projecting over the operator's floor.

6. A milking parlor comprising: an operator's floor at a certain level; a cow floor at a higher level, said cow floor having a saw-tooth shaped margin; and a plurality of stalls in stepped arrangement on the cow floor adjacent said margin, each saw-tooth portion having one edge with a length of the same order as that of a stall and the other edge with a length approaching the width of a stall, each such portion at least partly supporting a stall and each stall having a feed trough and feed chute at one end thereof, each chute overhanging said other edge of the saw-tooth portion supporting the stall.

7. A milking parlor comprising: an operator's floor at a certain level; a cow floor at a higher level; and a plurality of stalls in stepped arrangement on said floor, each stall having a substantial portion thereof spaced from and projecting over the operator's floor and including a feed trough and feed chute at one end thereof.

HENRY B. BABSON.
CHESTER A. THOMAS.

REFERENCES CITED

The following references are of record in the file of this patent:

UNITED STATES PATENTS

| Number | Name | Date |
| --- | --- | --- |
| Re. 22,657 | Babson et al. | Aug. 7, 1945 |
| 75,595 | Stone | Mar. 17, 1886 |
| 624,795 | Hammond | May 9, 1899 |
| 1,851,125 | MacMillan | Mar. 29, 1932 |
| 1,863,603 | Marshall | June 21, 1932 |
| 1,934,177 | Ferris | Nov. 7, 1933 |
| 2,085,308 | Gandrud | June 29, 1937 |